Nov. 22, 1955  R. P. ROETTER  2,724,555
VALVE UNIT FOR CONTROL APPARATUS
Filed Oct. 30, 1950  3 Sheets-Sheet 2
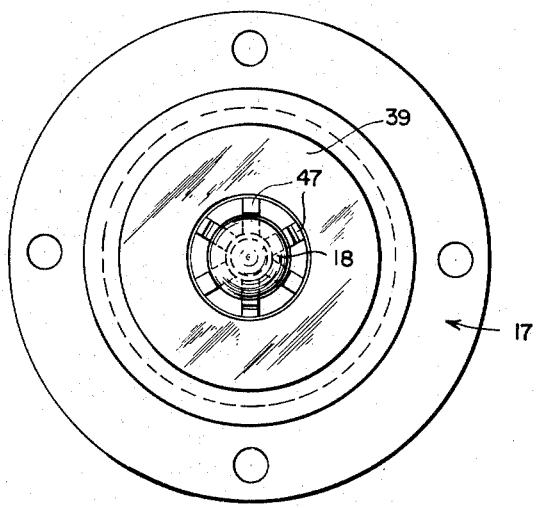
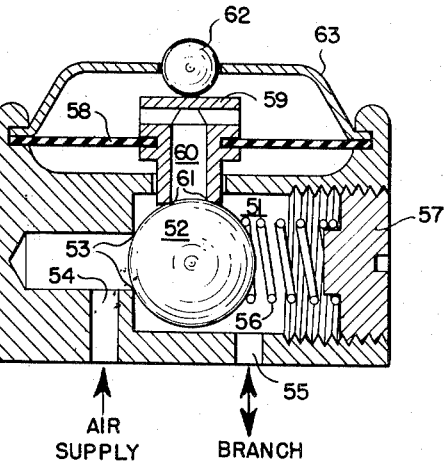
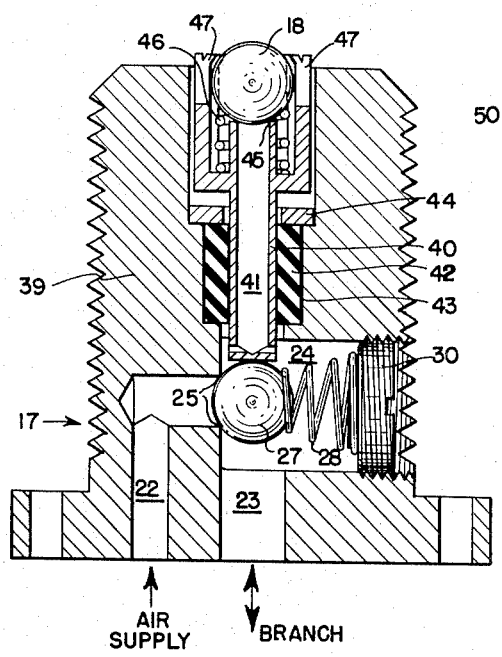
INVENTOR.
ROBERT P. ROETTER
BY
*George H. Fisher*
ATTORNEY Nov. 22, 1955     R. P. ROETTER     2,724,555
VALVE UNIT FOR CONTROL APPARATUS
Filed Oct. 30, 1950     3 Sheets-Sheet 3
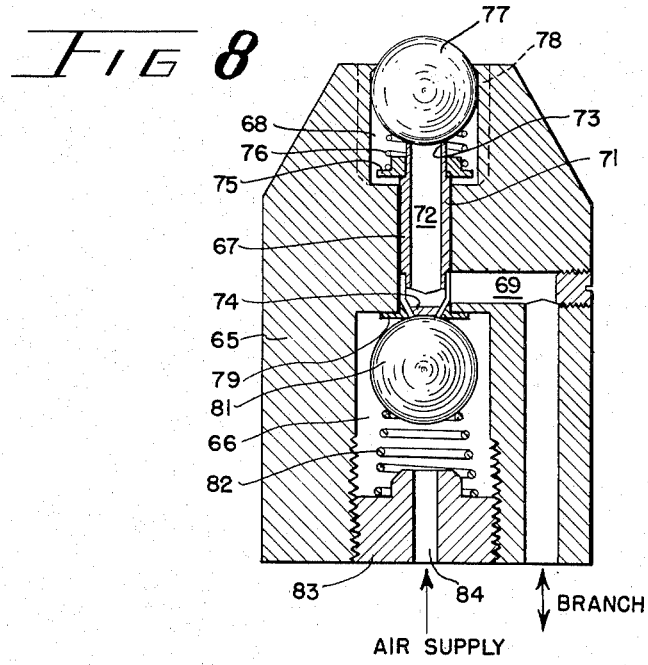
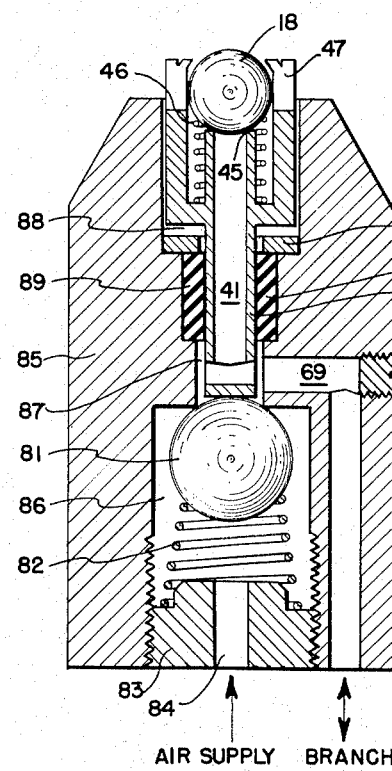
INVENTOR.
ROBERT P. ROETTER
BY
ATTORNEY

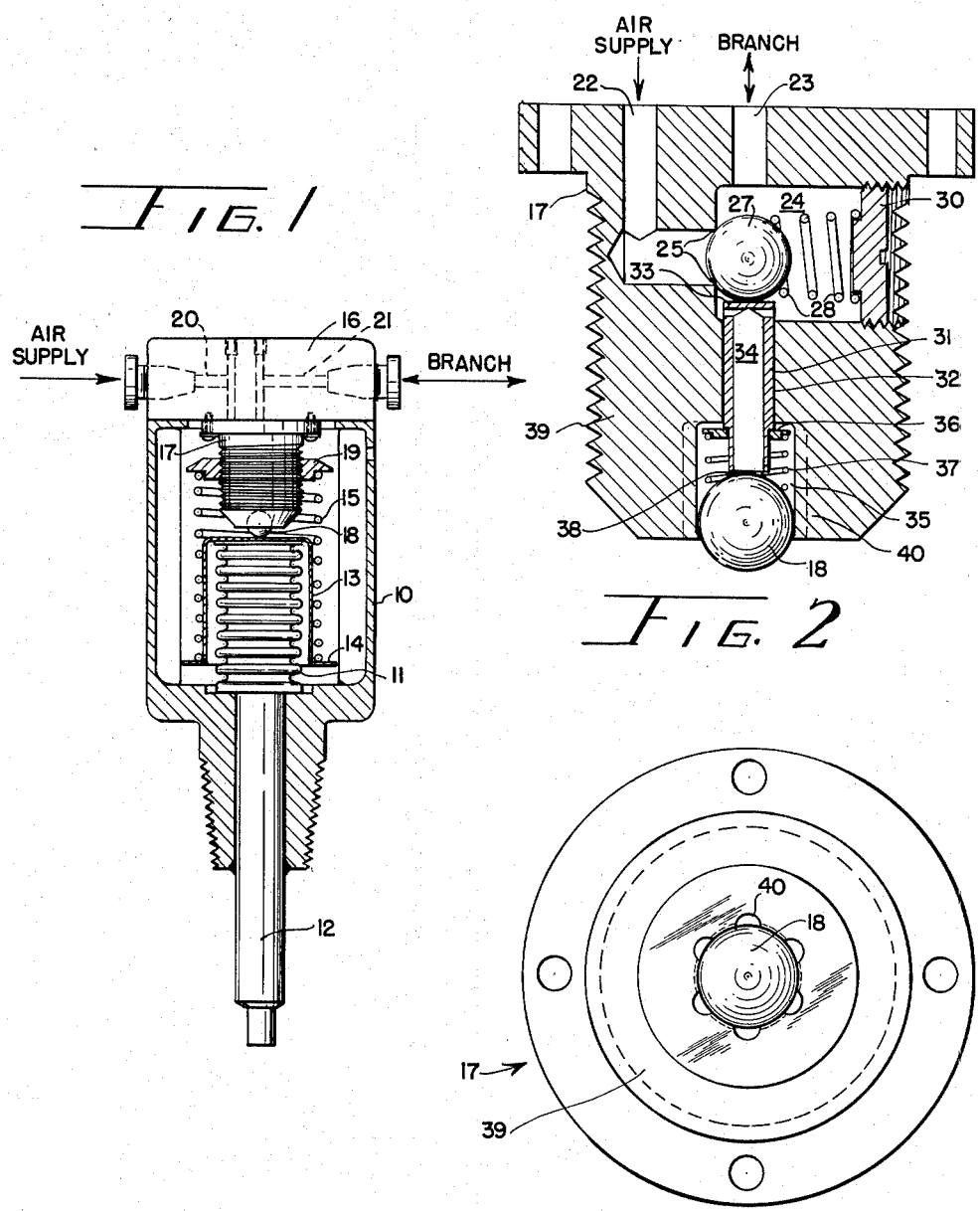

United States Patent Office 2,724,555
Patented Nov. 22, 1955

2,724,555

VALVE UNIT FOR CONTROL APPARATUS

Robert P. Roetter, Gary, Ind., assignor to Minneapolis-Honeywell Regulator Company, Minneapolis, Minn., a corporation of Delaware Application October 30, 1950, Serial No. 192,923

14 Claims. (Cl. 236—86)

The present invention relates to a non-bleed control device of the pneumatic type incorporating an improved valve unit. Pneumatic control devices generally use either bleed or non-bleed valve units, the bleed type usually being preferred where very easy operation is required and the non-bleed type being preferable where air economy is desired. The ideal sought is a non-bleed unit having the operating characteristics of the bleed type valve, thereby combining the best features of both. The present non-bleed valve unit approaches the bleed type valve in ease of operation and has many other advantages over previous units of the non-bleed type.

It is desirable, and an object of this invention, to provide an easily operated non-bleed unit with enough air handling capacity to control most pneumatic apparatus without requiring an intermediate relay, this being accomplished by using sufficiently large supply and discharge valves.

Because the supply valve must normally be held against its seat by a spring strong enough to close against the pressure of the supply main, it is an object of this invention to provide means for unseating the valve having an appreciable mechanical advantage in opposing said spring.

Non-bleed valve units are generally rebalanced by the branch pressure developed in the unit and it is a further object to keep the rebalance forces as small as possible, this being accomplished by making the effective area of the sealing means between the point of application of the operating force and the valve means as small as possible.

In addition to its effective operation as a valve unit, the unit should be simple to manufacture and small and compact and it is an object to provide such a unit. The small size not only permits improved controller design but also, and especially in the case of thermostats, the decreased mass results in a more sensitive instrument.

These and many other objects will become apparent upon a study of the following specification and drawing wherein:

Figure 1 is an elevation view of a thermostat embodying the present valve unit, with parts in section.

Figure 2 is an enlarged sectional elevation view of the valve unit shown in Figure 1.

Figure 3 shows the operating end of the valve unit shown in Figures 1 and 2.

Figure 4 is an end view of a modified valve unit.

Figure 5 is a sectional elevation of the valve unit of Figure 4.

Figure 6 is an elevation view of another modification of the valve unit, this figure showing the full size of the unit.

Figure 7 is an enlarged sectional elevation view of the valve unit of Figure 6.

Figure 8 is a sectional view of another modification of the valve unit.

Figure 9 is a sectional view of still another modification of the valve unit.

The engine cooling system thermostat of Figure 1 comprises a body 10 to which is attached a thermostatic unit comprising bellows 11 and a volatile fill bulb 12. This thermostatic unit is conventional in nature and is believed to need no further description. Bellows 11 is almost completely enclosed by an inverted cup-like member 13 having a bottom flange 14 for engaging a spring 15, the spring serving to oppose the expansive force of the bellows. A connection block 16 is attached to the top of body 10 by means not shown and has attached thereto a valve unit 17, the valve unit 17 including an operating member 18 engaging cup 13 so that movement of cup 13 caused by bellows 11 causes operation of the valve unit. The valve unit 17 is threaded on its outer surface, with the threads carrying an adjustable spring retaining nut 19, the nut being screwed up or down on the valve unit to vary the force of spring 15 and thereby vary the control point of the instrument. Nut 19 coacts with a scale, not shown, to indicate the setting of the instrument. Air is supplied to valve unit 17 through passages 20 in connection block 16 and the branch pressure developed by the instrument for controlling a pneumatic motor or the like is communicated through passage 21, these passages communicating with passages 22 and 23, respectively, in the valve unit 17, as shown in Figure 2.

As best shown in Figure 2, the valve unit 17 includes a hollow space 24 with a valve seat 25 at one side of this space, the valve seat 25 being arranged across supply conduit 22, the branch passage 23 directly communicating with the space 24. A ball valve member 27 is held against seat 25 by a spring 28 which is held in place by a threaded plug 30, the force exerted by spring 28 being adjusted by plug 30. Spring 28 is normally adjusted to hold ball 27 against its seat against the maximum pressure developed in the supply passage 22, this pressure, in normal pneumatic control systems being about 15 pounds per square inch, but devices of this sort are also made to control pressures upwards of 90 pounds per square inch in the supply passage. Extending longitudinally of valve unit 17 is a bore 31 arranged in substantial alignment with ball 27, and a very closely fitting slidable hollow sleeve 32 is arranged within this bore, sleeve 32 having a flat end portion 33 bearing against ball 27 for a purpose which will appear. Sleeve 32 has a waste passage 34 extending from space 24 to the atmosphere. A recess 35 is formed in the outer and lower end of valve unit 17 concentric with bore 31, this recess being large enough to receive a collar 36 attached to sleeve 32 and acting as a retainer for spring 37. Also fitted within recess 35 is an operating member or ball 18, this ball 18 being capable of closing the outer end 38 of sleeve 32 and thereby stopping a flow of air through waste passage 34, spring 37 bearing against ball 18 and tending to keep it off seat portion 38 to permit continuous escape of air from space 24. Ball member 18 is preferably held in recess 35 by a slight inward deformation of the outer ends of body 39 of valve unit 17 around the edge of recess 35, air being permitted to escape past ball 18 by virtue of grooves 40 cut in the side of recess 35.

In the position shown, and assuming that air pressure at 15 pounds per square inch is imposed against ball 27 through passage 22, the ball 27 remains against its seat because of the force of spring 28. As ball 18 is away from seat portion 38 of sleeve 32, space 24 is in communication with the outside atmosphere, hence the pressure in space 24 and in branch passage 23 is atmospheric. If pressure should now be imposed on ball 18 by bellows 11 and cup 13, the first movement will tend to push ball 18 against seat portion 38 and close off waste passage 34. Further upward movement of ball 18 will cause sleeve 32 to move upwardly and rotate ball 27 away from its seat, the ball tending to rotate about the upper edge of seat 25 and thus moves against spring 28. As ball 27 leaves seat 25 at any point, air under pressure from passage 22 rushes into space 24 and builds up pressure in this space and in branch passage 23. As the pressure builds up in this passage, it also tends to push sleeve 32, which now acts as a piston, outwardly, and when the outward pressure of sleeve 32 and the force on the ball 18 resulting from the pressure in passage 34, plus the other forces involved, balances the force exerted by bellows 11, spring 28 is again able to force ball 27 against its seat and close off passage 22. However, the air pressure in space 24 and branch 23 is now higher than before and pneumatic apparatus controlled by this branch pressure will assume a position depending on the branch pressure. If the pressure exerted by the thermostat continues to increase, the force exerted against ball 18 increases, thereby again forcing ball 27 off its seat and permitting a further increase in pressure in space 24, this pressure again building up until the adidtional force exerted by sleeve 32 against ball 18 is able to substantially counter-balance the additional force exerted by bellows 11, this operation continuing until the thermostat is satisfied or until the branch pressure and the supply pressure are the same.

If the force exerted by bellows 11 should now decrease, the decrease in force against ball 18 permits the air pressure within passage 34 acting on the ball and the spring 37 to push the ball away from the seat portion 38 of the sleeve and thereby open the waste passage to permit escape of air from space 24. As the air escapes from space 24, the pressure exerted on ball 18 by the air in passage 34 is diminished and when this diminished pressure plus the force of spring 37 reaches substantial equilibrium with the force exerted by bellows 11, ball 18 again closes off the end of sleeve 32 to close the waste passage and prevent a further decrease in branch pressure. Because sleeve 32 is relatively small in diameter, and is easily movable because of its close lapped fit with bore 31, it is very responsive to changes in pressure and a relatively small change in force is necessary to cause operation of the valve unit, this resulting in a relatively low throttling range for the instrument.

In other words, because of the small area of the piston caused by sleeve 32, the rebalance forces of the instrument are small and the small rebalance forces require only a relatively small change in force exerted by the thermostatic element to effect a complete change in the operation of the instrument. In considering the operation of this instrument it should be kept in mind that Figure 2 is an enlarged showing of the valve unit, actual valve units now being made being approximately ⅝ inch by ⅝ inch with sleeve 32 being only 1/16 of an inch in diameter. Although the close fitting sliding sleeve 32 permits minimum rebalancing forces, other arrangements are entirely feasibly where minimum rebalancing forces are not necessary. Attention is directed to the proportions of the valve unit wherein the line of force of sleeve 32 against ball 27 is a greater distance from seat 25 than the line of force of spring 28.

Figures 4 and 5 show a modification of the present valve unit, with the valve body 39 of unit 17 being essentially the same as before, especially as relates to supply passage 22, branch passage 23, space 24, seat 25, ball 27, spring 28 and adjusting plug 30. However, sleeve 40 having waste passage 41 therethrough is substantially aligned with ball 27, as before, but rather than having a close sliding fit with a bore in body 39, the sleeve 40 extends through an outer cylindrical sleeve 42 held in recess 43 of body 39 by a retaining washer 44. Sleeve 42 is made of a relatively soft rubber-like material such as silicone rubber and fits tightly enough about sleeve 40 so that there is no relative movement between the sleeve 40 and the outer sleeve 42. While these parts may may be readily pushed together, the small forces exerted by the air pressure are not sufficient to cause relative movement. The very slight movements of sleeve 40 necessary for operation of the device are accommodated by the flexibility of the rubber-like sleeve 42 and it has been found that the "piston" formed by a plugged sleeve 40 held by rubber-like sleeve 42 has an effective area based on the median diameter of sleeve 42.

A ball 18 is used to control flow through passage 41 by coacting with seat portion 45 formed at an end of passage 41, with a spring 46 being used to assist the pressure in 41 in moving ball 18 away from seat portion 45. In the previous example, ball 18 was guided by a recess in body 39 of the valve unit but, in this case, it has been found preferable to form guide flanges 47 on sleeve 40 and the recess formed in the outer end of body 39 is large enough to give ample clearance between the guide flanges and the body of the unit. At least part of guide flanges 47 are slightly deformed at their outer ends to prevent ball 18 from escaping from the unit during handling. The integral guide flanges are formed on sleeve 40 in this example, although not used in the previous example, because sleeve 40 may not be so accurately guided in this example as in the previous one. Where the sleeve was lapped to fit with a bore in the body of the valve unit, it is, of course, very accurately guided but, in the present instance, due to the softness of the rubber-like material, the sleeve 40 may not be so accurately guided and it is therefore preferable to use guide means attached to sleeve 40 as shown.

In operation, this valve unit acts exactly like the one previously described with the exception that the rebalance forces formed are somewhat larger and the range of forces exerted by the thermostatic element must necessarily be larger to cause operation of the instrument through its throttling range. In this modification also, note that the line of force of sleeve 40 on ball 27 is further way from seat 25 than is the line of force of spring 28 on the ball, thereby giving sleeve 40 a mechanical advantage in unseating the ball.

Figures 6 and 7 show another modification of the present valve unit, Figure 6 being approximately a full-sized showing of the valve unit shown in section, enlarged, in Figure 7. In Figure 7, body 50 includes a space 51, a ball valve member 52 coacting with a seat 53 and having a supply passage 54 and a branch passage 55, a spring 56 and a plug 57 all generally the same as the corresponding elements found in the previous modifications. However, in this case, the opening to the atmosphere is sealed by a diaphragm 58 having a member 59 attached thereto, the member 59 having a waste passage 60 and a seating portion 61 adapted to engage ball 52. The operating force for this device is exerted by a ball member 62 guided by a cap member 63, with the ball exerting force against member 59 and tending to push member 59 downward against ball 52 so that seating portion 61, in coacting with ball 52, closes waste passage 60. Thus, as pressure is exerted on ball 62, the first operation comprises the pushing of member 59 against ball 52 so that the ball 52 seals off seat portion 61 and prevents escape of air from space 51. A further exertion of force on 62 tends to rock ball 52 off seat 53 and thereby permit supply air to enter space 51. The air pressure in space 51 is exerted against the underside of diaphragm 58 and, as this pressure builds up, the upward force of diaphragm 58 against ball 62 counterbalances the force exerted by the control device, thereby bringing about equilibrium. If the force exerted by ball 62 against element 59 and diaphragm 58 should diminish, the air pressure under diaphragm 58 tends to lift member 59 away from ball 52 and thereby permits air to escape past seat portion 61 and through passage 60 to the atmosphere, the air reaching the atmosphere through the loosely fitting hole about ball 62 or through another opening in 63, not shown. In this example, as in the other, it will be noted that the line of force exerted by the operator against ball 52 is at a greater perpendicular distance from the valve seat 52 than is the line of force exerted by spring 56 relative to the valve seat. Thus, the operator ball 62 has a mechanical advantage as relates to the spring 56 in rocking the ball on one edge of the valve seat against the force of the spring. The mechanical advantage thus obtained has a greater effect than might be imagined because not only is the spring opposed by a relatively greater force due to the mechanical advantage but also, compared to the movement of the operator, there is less movement of the spring. Assuming that the operator in Figure 7 has a 2 to 1 advantage relative to spring 56 in rocking ball 52 off its seat 53, it is obvious that the force exerted by ball 62 is then doubled, in effect, in opposing spring 56. In addition to this doubling of the operating force, ball 52 is moved against spring 56 by only half the amount that would be the case if there were no mechanical advantage involved. Because these factors are cumulative, there is actually only ¼ the change in spring force against the ball that would be exerted if there were no mechanical advantage in favor of the operator. This greatly reduced change in spring force, or spring rate, permits smaller changes in force by the condition responsive element, or thermostat in the present case and thereby permits a smaller and more sensitive element or thermostatic device to be used. By making valve seat 53 considerably smaller in diameter, so that the line of force of the operator would be four times as far from the spring seat as the line of force exerted by spring 56, then there would be a mechanical advantage of four and the movement of the spring would only be ¼ of the movement of the operator so that the spring rate change would only be 1/16 of that which would exist if there were no mechanical advantage. However, as the valve seats is made smaller, a greater movement of the ball is required to gain the desired air handling capacity so a workable compromise must be made between operating force and the amount of movement of the operator hence the most practical units so far made have used relatively small ratios of mechanical advantage. Although this discussion of mechanical advantage has been more specifically applied to the unit of Figures 6 and 7, it applies equally well to the other units described, both of which show a mechanical advantage in favor of the operator.

If no mechanical advantage is needed, the other advantages of the present valve units, such as small rebalance forces, small size and easy operation may be had in the somewhat simplified modifications shown in Figures 8 and 9.

In Figure 8, body 65 has supply chamber 66, a bore 67 and an end recess 68 all in alignment and has a branch passage 69 communicating with a lower portion of bore 67. A tubular member 71 is lapped to a close sliding fit in bore 67, member 71 including a discharge passage 72, an upper seat portion 73 and a lower reduced flattened end portion 74. In addition the upper portion of tubular member 71 carries a retaining flange 75 for supporting a light spring 76 which tends to unseat ball 77 which coacts with seat portion 73. As in Figure 2, portions of body 65 around recess 68 are preferably slightly deformed to retain ball 77, air escape being facilitated by grooves 78. A valve seat member 79 is fitted in the lower end of bore 67 and coacts with supply valve ball member 81 held against the seat member by spring 82. Spring member 82 is retained by threaded plug 83 through which extends supply air passage 84. The seat area of member 79 is reduced as much as possible, consistent with the desired air handling capacity, to minimize the force due to air pressure in space 66 holding the ball against the seat and to thereby permit easier operation of the unit.

In this modification, as in the others, the initial force on ball 77 tends to seat it against the upper end of tube 71 and thus seal off branch passage 69. A further force against ball 77 causes ball 81 to be forced away from seat 79 and permit air pressure to build up in branch passage 69 due to the inrush of supply air. As the pressure builds up in branch passage 69, the piston effect of tube 71 increases and tends to rebalance the force exerted against ball 77, this going on until equilibrium is reached. Upon a decrease in force against ball 77, spring 76 tends to move ball 77 off seat 73 and permit the escape of air from branch passage 69, and thereby diminish the rebalance force of tube 71, until equilibrium is again established.

The modification of Figure 9 will require larger operating forces than that of Figure 8 for it lacks the reduced valve seat and it will have larger rebalance forces due to the larger effective area of the sleeve sealed tube but this modification involves very much smaller forces than the prior art devices. Obviously, the reduced area seat arrangement can be used with this modification if desired.

In Figure 9, body 85 has a supply chamber 86, a bore 87 and an upper recess 88 all in alignment as before, recess 88 being somewhat larger than 68 and bore 87 having an enlarged portion 89 for receiving sleeve 90, sleeve 90 being made of a durable relatively soft rubber-like material such as a silicone rubber, the sleeve being held in place by a retaining washer 91. Plug 83, passage 84, spring 82, ball 81 and branch passage 69 are essentially the same as in Figure 8 hence have been similarly numbered, ball 81, however, seating on the lower end of bore 87. The operator portion of this unit is the same as that in Figure 5 so the similar parts are similarly numbered. Thus, tube 40 has a discharge passage 41, an upper seat portion 45, a spring 46 tending to move ball 18 off seat 45, and guide flanges or arms 47. Here, as before, the initial force on ball 18 closes the discharge passage; a further force tends to unseat ball 81 and increase the branch pressure and the rebalance force, and equilibrium is obtained in the manner previously described. Likewise, a reduction of force on ball 18 permits spring 46 to unseat ball 18 enough to reduce the branch pressure and the rebalancing forces until equilibrium is again reached. In this modification, as in Figure 5, the rebalance forces are somewhat larger than where the tube slidably fits the bore due to the somewhat larger effective area of the sleeve seal but, of course, these rebalance forces are very much smaller than where even the smallest practical diaphragms are used.

As a study of the above specification and drawings will reveal many substitutions and equivalents, the scope of the present invention should be determined only by the appended claims.

I claim as my invention:

1. A control device comprising; a force exerting condition responsive element; a spring opposing said element; means for adjusting said spring; and valve means arranged to be actuated by said element, said valve means comprising a supply valve and an initially open waste valve, spring means normally biasing said supply valve closed against the force of supply pressure, said waste valve being arranged so that an increase in force by said element first closes said waste valve, and means positioned between said waste valve and said supply valve for exerting force against said supply valve transverse to the direction of force of the biasing means normally holding said supply valve closed.

2. In a controller, a valve unit comprising a body member, a hollow space in said member, a valve seat in said member at one side of said space, an air supply passage connected to said space through said seat, a branch passage through said body to said space, a valve member held in engagement with said seat by a spring against the force of a supply pressure, a member movably connected to said body, said movable member being movable in a direction transverse to the line of action of said spring, said movable member being arranged to engage said valve member and operable to pivotally force at least a portion of said valve member away from said seat against the force of said spring, a waste passage through said movable member for connecting said space with the atmosphere, and initially open valve means for controlling said waste passage, said valve means being arranged to close said waste passage before sufficient force is exerted by said movable member to open said supply valve.

3. A valve unit having a body, a space within said body, a circular valve seat in said body at one side of said space, a supply passage extending through said body and said seat to said space, a branch passage extending through said body to said space, a ball valve member engageable with said seat for closing said supply passage, a spring arranged to hold said ball valve member against its seat in opposition to the pressure in said supply passage, said spring exerting a force in substantial alignment with the axis of said valve seat, an opening in said body between said space and the atmosphere, means including a movable member for closing said opening, said movable member being movable at an appreciable angle to said axis and engageable with said ball member in a manner to rotate said ball member away from said seat, a waste passage through said movable member, and means for closing said waste passage before said ball member can be forced away from said seat.

4. A valve unit as described in claim 3 wherein a valve seat is formed across said waste passage, said movable member being so arranged that the valve seat of said movable member is adapted to engage said ball valve member.

5. A valve unit as described in claim 3 wherein the means including a movable member for closing the opening comprises a diaphragm and wherein the waste passage is formed in a member attached to and movable with said diaphragm.

6. A valve unit as described in claim 3 wherein the means including a movable member for closing the opening comprises a flexible relatively soft rubber-like sleeve and wherein said waste passage is formed by a tube extending through said sleeve, a portion of said sleeve and said tube forming rebalance means.

7. A valve unit as described in claim 3 wherein the movable means for closing the opening comprises a tubular member fitted in close fitting sliding relation to said opening.

8. A force balanced valve unit having a body, a branch passage within said body, a circular valve seat in said body, a supply passage extending through said seat and communicating with said branch passage, a ball valve member engageable with said seat for closing said supply passage, a spring arranged to hold said ball member against said seat in opposition to pressure in the supply passage, an opening in said body from said branch passage to the atmosphere, a movable member engageable with said ball member in a manner to move it away from said seat, means including a flexible sleeve for sealing said movable member to said body and thus close said opening, said sealing means having a pressure sensitive diameter less than the diameter of said ball member, a waste passage through said movable member, and means for closing said waste passage before said ball member can be forced away from said seat, said sleeve and movable member forming rebalance means.

9. A valve unit as described in claim 8 wherein the sealing means comprises a diaphragm and wherein the waste passage is formed in a member attached to and movable with said diaphragm.

10. A valve unit as described in claim 8 wherein the movable means comprises a tubular member arranged in close fitting sliding relation to said opening.

11. A valve unit as in claim 8 wherein the spring pushes against the ball valve member in one direction and wherein the movable member moves in substantial alignment with said direction and wherein the movable member is sealed to said body by a close sliding fit between said member and said body.

12. A valve unit as in claim 8 wherein the spring pushes against the ball valve member in one direction and wherein the movable member moves transversely of said direction and wherein the movable member is sealed by a close sliding fit between said member and said body.

13. A valve unit as in claim 8 wherein the spring pushes against the ball valve member in one direction and wherein the movable member moves in substantial alignment with said direction and wherein the movable member is sealed to said body by a relatively soft and flexible sleeve of rubber-like material arranged between said member and said body.

14. A valve unit as in claim 8 wherein the spring pushes against the ball valve member in one direction and wherein the movable member moves transversely of said direction and wherein the movable member is sealed by a relatively soft and flexible sleeve of rubber-like material arranged between said member and said body, said sleeve being soft and flexible enough and fitting the movable member tightly enough that the portion of the sleeve contacting the movable member moves with said member.

References Cited in the file of this patent

UNITED STATES PATENTS

| | | |
|---|---|---|
| 904,662 | Wells | Nov. 24, 1908 |
| 1,109,705 | Serrell et al. | Sept. 8, 1914 |
| 1,163,471 | Schramm | Dec. 7, 1915 |
| 1,278,749 | Roesch | Sept. 10, 1918 |
| 1,934,545 | Langdon | Nov. 7, 1933 |
| 2,028,177 | Williams | Jan. 21, 1936 |
| 2,253,930 | Carlson | Aug. 26, 1941 |
| 2,264,869 | Beardsley | Dec. 2, 1941 |
| 2,271,833 | Shipman et al. | Feb. 3, 1942 |
| 2,311,806 | Almond | Feb. 23, 1943 |
| 2,326,226 | Joesting | Aug. 10, 1943 |
| 2,327,898 | Hubley | Aug. 24, 1943 |
| 2,337,019 | Abplanalp | Dec. 21, 1943 |
| 2,349,484 | Converse | May 23, 1944 |
| 2,381,358 | Marshall | Aug. 7, 1945 |
| 2,567,071 | Jacobus | Sept. 4, 1951 |
| 2,618,155 | Conners et al. | Nov. 18, 1952 |